Figure 1:
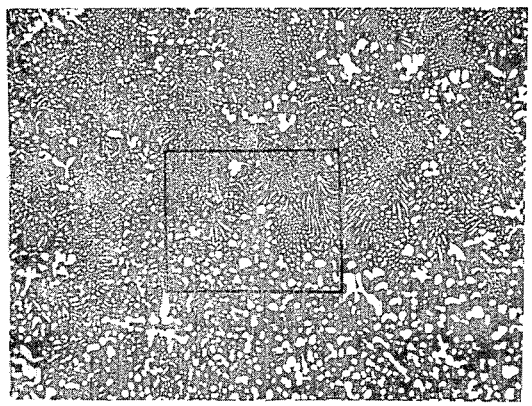

United States Patent Office 3,211,664
Patented Oct. 12, 1965

3,211,664
URANIUM MONONITRIDE FUEL AND
METHOD OF MAKING
Roy W. Endebrock, Columbus, Ohio, assignor to the United States of America as represented by the United States Atomic Energy Commission
Filed June 12, 1964, Ser. No. 379,403
7 Claims. (Cl. 252—301.1)

The invention relates to an improved fuel for nuclear reactors based on uranium mononitride and to a method of making the same, more particularly to an improvement in the reaction of uranium metal and elemental nitrogen under pressure in an electric arc.

Uranium mononitride has properties recommending its use as a fuel or fertile material in nuclear reactors. Among these are a high melting point, high density, high uranium concentration and chemical inertness. In order to get a product of sufficient purity, uranium mononitride may be made by the direct reaction of uranium metal and elemental nitrogen in an electric arc under pressure, the uranium metal being one of the electrodes of the arc. A process of this kind is described in the United States patent application by Ellis R. Foster, Jr. and Roy W. Endebrook, Serial No. 284,305, filed May 28, 1963, now Patent Number 3,178,259.

While the process of the application just mentioned produces a uranium mononitride of high purity, it has to be carried out at pressures between 250 and 350 p.s.i.g., which are equivalent to from 17 to 23.8 atmospheres. This is necessary in order to drive the reaction to completion so as to avoid residual uranium metal which is the result of a disproportionation, which also gives rise to higher nitrides of uranium such as $U_2N_3$ and $UN_2$. These impurities tend to migrate to grain boundaries and weaken the material.

The process also requires careful regulation of the current producing the arc, which necessitates the use of expensive electrical equipment, thus adding to the cost of the process, along with the cost made necessary by the high pressures referred to.

It is, accordingly, the general object of the invention to provide a ceramic containing uranium mononitride having the desirable properties of substantially pure uranium mononitride.

It is another object to provide an economical method of making such a ceramic.

Other objects will appear as the description proceeds.

The above objects are attained by my discovery that if uranium metal is initially alloyed with a minor amount of titanium, the resulting alloy may then be reacted with nitrogen in an electric arc in a manner similar to known methods of producing pure UN, but at much lower pressures, to produce a satisfactory product. The product will, of course, contain nitrides of titanium, but these, instead of migrating to grain boundaries in the manner of other impurities, form into discrete bodies within a matrix of uranium mononitride, and thus do not weaken it.

Not only does the presence of the titanium nitrides do no harm to the ceramic structure, but it appears to act in a positive, synergistic manner during the reaction of the uranium-titanium alloy with nitrogen so as to inhibit the disproportionation that leaves in the product the undesirable residual uranium metal and higher nitrides. Metallographic studies of the ceramic produced according to the invention show it to be a simple two-phase material with sharply defined bodies of titanium nitrides within a matrix of essentially pure uranium mononitride. This is just as true when the process is carried out at the comparatively low pressure of five atmospheres as when it is carried out at conventional pressures such as 20 atmospheres.

One explanation that has been advanced to explain the beneficial results stemming from the initial alloying of uranium by titanium, is that because of the wide range of nitrogen solubility in titanium, the latter acts as a kind of nitrogen reservoir for the uranium and furnishes it with just the stoichiometric amount needed to keep it in the mononitride state. Titanium forms a number of nitrides and goes from one valence state to another with nitrogen very easily, and this may support the explanation just mentioned. However, since this theory has not been fully established, I do not want to be bound by it, and my invention is offered empirically on the basis of observed results.

The amount of titanium with which the uranium base metal may be alloyed may vary somewhat, from about 5 to about 20 weight percent (w/o), 10 weight percent being preferred. This is equivalent to a range of about 20 to about 56 atom percent (a/o) of titanium, about 35.6 a/o titanium being preferred.

As already indicated, the process may be carried out at conventional pressures of 20 atmospheres or more, but, as I have discovered, the alloying with titanium also makes it possible to carry it out at much lower pressures, even as low as five atmospheres, with equally good results. Hence my invention may be regarded as an improvement on the known methods of producing stoichiometric uranium mononitride, as well as offering an improved uranium mononitride fuel with stabilizing particles of titanium nitride bodies randomly interspersed throughout.

Since the mole percentages of the constituents of the ceramic product follow the atom percentages of the alloy from which it is made, the total mole percentage of the titanium nitrides component may vary from about 20 mole percent (m/o) to about 56 m/o, with about 35.6 m/o being preferred. Due to the "reservoir" effect of the titanium nitride component above described, the uranium nitride component, whatever its mole percentage, will remain in the mononitride state, which is the important consideration. The exact valency state or states of the titanium nitride component are not important, so long as its total remains within the above mole percentage limits, and hence it may be represented by the formula $Ti_{(1+x)}N$, $x$ being a positive number. Preserving the stoichiometry of the UN component is all that matters, and this I have found to hold true so long as the overall mole percentage limits of the titanium nitrides are observed.

Reference is now made to the drawings, FIG. 1 of which shows a metallographic photograph of an acid-etched sectioned specimen made according to the invention from a starting alloy of 10 w/o titanium and the balance uranium, at a magnification of 250 times.

Figure 2:
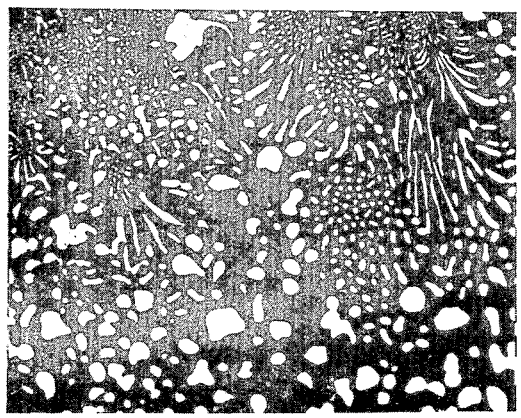

FIG. 2 is the area enclosed by the rectangle in the middle of FIG. 1, magnified 750 times.

The regularity and simplicity of the ceramic structure shown in the figures will be noted. The black-colored matrix of stoichiometric UN is continuous, and the light-colored bodies of the nitrides of titanium are for the most part discrete units, or at most agglomerations of only a few members. They are arranged in random fashion, indicating a true dispersion structure, and not in large agglomerations or continuous linear areas, which would indicate migration to grain boundaries.

EXAMPLE I

Five alloys of uranium and titanium, varying in titanium content from 0.5 to 20 weight percent, and the balance in all cases uranium, were separately reacted with elemental nitrogen under pressure in an electric arc.

The conditions of the five reactions are set forth in the following Table I:

*Table I*

| Ti Comp., w/o | N₂ Press., p.s.i.g. | Arc Pot., v. | Arc Current, amp. | Arc Interruptions | Total Time of Melt, min. |
|---|---|---|---|---|---|
| 0.5 | 300 | 70 | 135 | 3 | |
| 1.0 | 300 | 70 | 125-140 | 2 | 76 |
| 5 | 300 | 70 | 140 | 4 | 60 |
| 10 | 300 | 70 | 155 | | 77 |
| 20 | 300 | 70 | 180-210 | | 79 |

The products of the above reactions were removed from the reaction apparatus after solidification, sectioned and etched with a mixture of 50% lactic acid and 50% nitric acid. Metallographic photographs, or photomicrographs, were then made of the etched surfaces. FIGS. 1 and 2 are the photomicrographs taken at magnifications 250 and 750 times, respectively, of the product resulting from the reaction with nitrogen of the next to bottom alloy listed in Table I, containing 10 w/o titanium and the balance uranium.

The simple, two-phase structure with the titanium nitrides in a true dispersion configuration within a continuous UN matrix has already been commented upon.

Specimens of the products of the reactions on the three lowest lines in Table I were then subjected to four Knoop hardness tests under a 50 gram load across the face of each specimen. In the case of the specimen whose starting material contained 20 w/o titanium the bodies, or grains, of UN were large enough to make the tests on them separately. The results are set forth in Table II, as follows:

*Table II*
Knoop hardness data (50 g. load):
  (1) Uranium—5 w/o titanium—nitrogen 969, 1027, 1167.5, 1216
  (2) Uranium—10 w/o titanium—nitrogen 1630, 907.5, 1045, 1045, 1262.5
  (3) Uranium—20 w/o titanium—nitrogen UN grains: 519, 574, 560
  TiN grains: 1045, 969, 1087

The variations in hardness numbers across the surfaces of the specimens confirm the fact that the bodies of titanium nitride are dispersed throughout the matrix of uranium mononitride. The tests on the separate UN and TiN grains in the products containing 20 w/o titanium indicate that the TiN grains are almost twice as hard as the UN grains, and thus further confirm the above conclusions.

EXAMPLE II

Metallographic comparisons between the various products of Example I disclosed that the specimen coming from the starting alloy having 10 w/o titanium and the balance uranium had the best structure of all the materials produced. This starting alloy was then selected as a preferred material to study the effect of nitrogen pressure variations during the formation of the ceramic product. Maintaining all other conditions the same as in Example I, specimens were produced under pressures of 20, 10 and 5 atmospheres of nitrogen. These were then sectioned, etched, photographed and tested as in Example I.

The results of the above tests revealed no significant differences between the products. Hence it is concluded that since the product produced under 5 atmospheres of nitrogen is just as good as one produced under 20 atmospheres, the first named pressure is to be preferred since it requires less expensive equipment.

It will be understood that the invention is not to be limited to the details given herein but that it may be modified within the scope of the appended claims.

The embodiments of the invention in which an exclusive property or privilege is claimed are defined as follows:

1. Stoichiometric uranium mononitride having randomly dispersed therein essentially discrete bodies of nitrides of titanium.

2. Stoichiometric uranium mononitride having randomly dispersed therein from about 20 to about 56 mole percent of discrete bodies of $Ti_{(1+x)}N$, $x$ being a positive number.

3. Stoichiometric uranium nitride having randomly dispersed therein about 35.6 mole percent of discrete bodies of $Ti_{(1+x)}N$, $x$ being a positive number.

4. In the reaction of uranium metal and elemental nitrogen under pressure within an electric arc to produce uranium mononitride, the improvement consisting of pre-alloying the uranium metal with from about 5 to about 20 weight percent titanium metal.

5. In the reaction of uranium metal and elemental nitrogen under pressure within an electric arc to produce uranium mononitride, the improvement consisting of pre-alloying the uranium metal with about 10 weight percent titanium metal, and maintaining the pressure at about 5 atmospheres.

6. A method of producing a predominantly uranium mononitride ceramic material containing discrete bodies of nitrides of titanium, comprising reacting an alloy consisting of from about 5 to about 20 weight percent titanium and the balance uranium with elemental nitrogen under pressure in an electric arc.

7. The method of claim 6 where the alloy is 10 weight percent titanium and the balance uranium and the pressure is about 5 atmospheres.

References Cited by the Applicant
UNITED STATES PATENTS
2,544,277  3/51  Newton et al.

OTHER REFERENCES
BMI-X-10019, pages 9-11.

CARL D. QUARFORTH, *Primary Examiner.*